United States Patent
Kasami et al.

(10) Patent No.: US 6,434,108 B1
(45) Date of Patent: Aug. 13, 2002

(54) OPTICAL DISC HAVING NARROW RECORDING TRACK RELATIVE TO LIGHT SPOT DIAMETER

(75) Inventors: Yutaka Kasami; Koichi Yasuda; Atsushi Fukumoto, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/564,639

(22) Filed: Nov. 29, 1995

(30) Foreign Application Priority Data

Nov. 29, 1994 (JP) .............................................. 6-294915

(51) Int. Cl.[7] ................................................ G11B 7/24
(52) U.S. Cl. .................................................... 369/275.4
(58) Field of Search ........................... 369/275.1–275.4

(56) References Cited

U.S. PATENT DOCUMENTS

| 5,339,304 | A | * | 8/1994 | Hanaoka | 369/275.4 |
|---|---|---|---|---|---|
| 5,341,362 | A | * | 8/1994 | Fujii et al. | 369/275.4 |
| 5,398,232 | A | * | 3/1995 | Omata | 369/275.4 |
| 5,504,734 | A | * | 4/1996 | Morita | 369/275.4 |
| 5,517,486 | A | * | 5/1996 | Haneda | 369/275.4 |

* cited by examiner

*Primary Examiner*—Nabil Hindi
(74) *Attorney, Agent, or Firm*—Sonnenschein, Nath & Rosenthal

(57) ABSTRACT

An optical disc on or from which information signals are recorded/reproduced by irradiation of a laser light beam is disclosed. The optical disc has a plurality of top surfaces, a plurality of bottom surfaces, and a plurality of portions formed on a major surface of a disc substrate of the optical disc. The portions separate the top and bottom surfaces from each other. A recording track is constituted by each top surface and each bottom surface. Each bottom surface and each top surface have a first width, while each portion has a second width. The recording track has a track pitch P defined by the sum of the first width and said second pitch. The pitch is related with the second width and the spot diameter of the playback light $\phi$ by a formula and $P < \phi/2$ and $0.1 \mu m <$ second width $\leq \phi/2.5$.

9 Claims, 5 Drawing Sheets

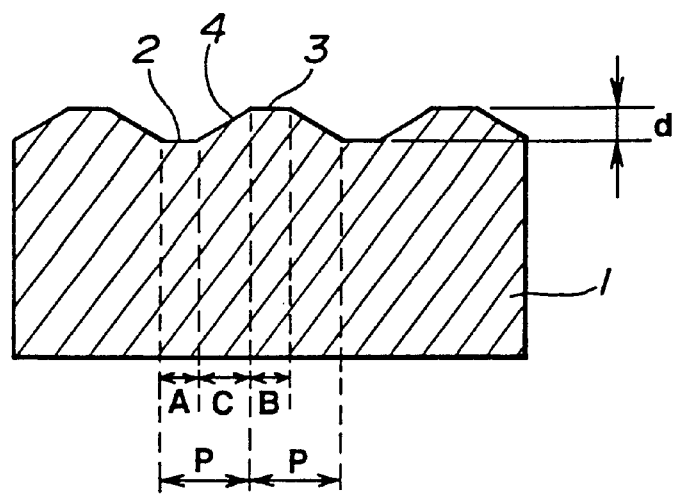
FIG.5
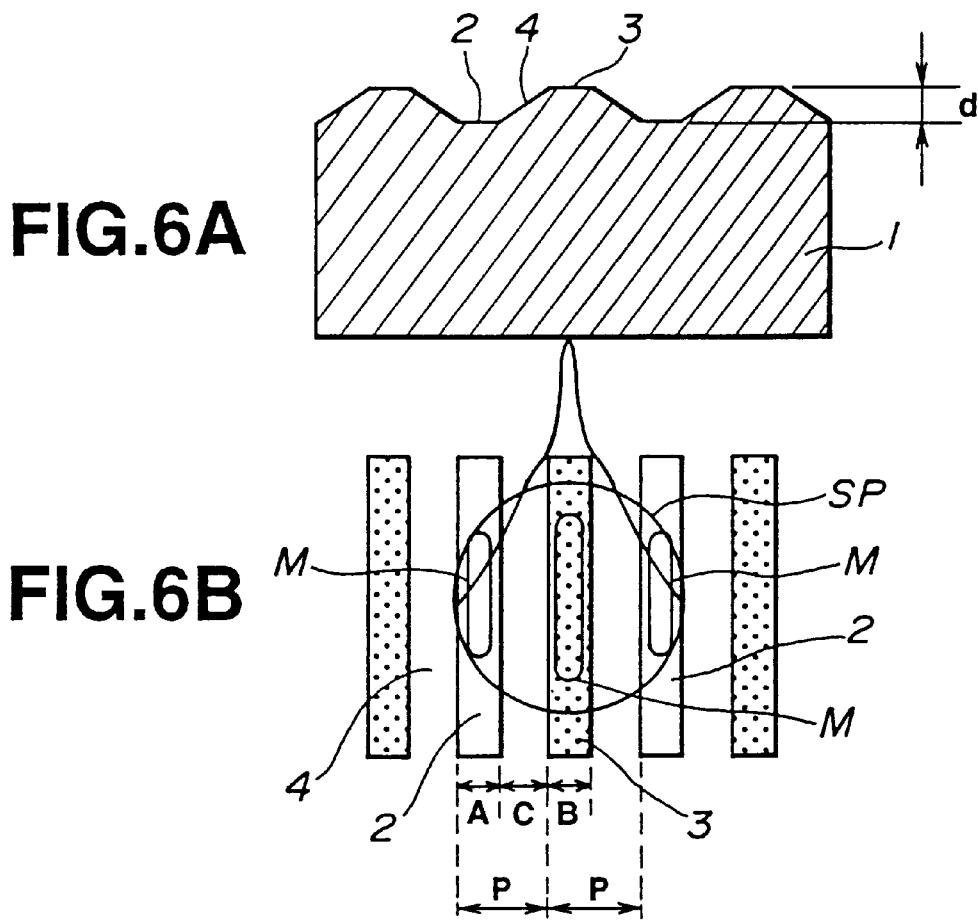
FIG.6A
FIG.6B

OPTICAL DISC HAVING NARROW RECORDING TRACK RELATIVE TO LIGHT SPOT DIAMETER

BACKGROUND OF THE INVENTION

This invention relates to an optical disc on or from which information signals are recorded/reproduced on irradiation of a laser light beam, and an optical disc substrate used therefor.

RELATED ART

Among known optical discs capable of recording/reproducing information signals by the user, there are a phase-change type optical disc, having a layer of a phase-change type material as a recording layer, and a magneto-optical disc having a thin film of a rare earth metal-transition metal alloy as a recording layer.

Specifically, such optical disc is configured so that a dielectric layer, a reflective layer and a protective layer are formed along with the recording layer on a transparent substrate for controlling optical properties and for assuring durability.

On such optical disc, the optical properties of minute-sized domains of the recording layer are changed by irradiation of a laser light for generating a number of pits, and information signals are recorded as a pattern of these pits. Such recording is carried out along numerous guide grooves of different diameters formed on substantially concentric circles on a major surface of the transparent substrate. That is, tracking servo of the laser spots is carried out along the guide grooves as indices in order to permit recording/reproduction to occur at correct positions on the disc.

Referring to FIG. 1, showing the cross-section of the transparent substrate, the guide grooves 50 are formed at a preset pitch on a major surface of a transparent substrate 51. The flat surface within the guide groove 50 is termed a groove or a bottom surface 52, while the flat surface corresponding to the hillock between two neighboring guide grooves 50 is termed a land or a top surface 53. The in formation signals are usually recorded on the bottom surface 52 or on the top surface 53. The former recording system is termed an in-groove recording system, while the latter recording system is termed an on-land recording system.

An inclined surface 54 between the bottom surface 52 and the top surface 53 has an inclination angle of 40 to 60° and a width e of approximately 0.1 μm. This inclined surface operates as a heat-insulating surface and thus operates for prohibiting the spreading apart of the pit.

That is, the transparent substrate 51 has the bottom surfaces 52 representing the flat surface portion in the groove 50, the top surface 53 representing the flat surface of the hillock and the inclined surface 54 between the bottom surface 52 and the top surface 53. With the in-groove recording system, a width a of the bottom surface 52 represents the recording track width, and a total width (e+b+e) of the inclined surface 54, top surface 53 and the inclined surface 54 between the neighboring bottom surfaces 52 represents a width c of a heat insulating region, as shown in FIG. 1. On the other hand, with the on-land recording system, a width b of the top surface 53 represents the recording track width, and a total width (e+a+e) of the inclined surface 54, bottom surface 52 and the inclined surface 54 between the neighboring top surfaces 53 represents a width of a heat insulating region, as shown in FIG. 1.

With the optical disc, as with other recording media, there is a demand for a still higher recording density for information signals. The recording density on the optical disc may be classed into that along the length of the tracks and that in a direction perpendicular to the track. The recording density along the track length can be raised by reducing the diameter of the laser light beam spot for shortening the pit length. On the other hand, the recording density in the direction perpendicular to the track can be raised by reducing the track pitch.

However, if, with the above-described in-groove recording system or on-land recording system, the track pitch is narrowed to a value lesser than the value currently employed, such as 0.7 μm or less, interference from pits formed on a neighboring recording track is liable to be incurred, as a result of which cross-talk exceeding a prescribed value of −26 dB, may be produced in the playback signal.

FIGS. 2A, 2B schematically show an optical disc on which recording pits, which are amorphous pits, are formed in accordance with the in-groove recording system.

FIG. 2A is a cross-sectional view of a transparent substrate, and FIG. 2B is a top plan view of the disc with the playback light being shown converged on the groove 52. The width a of the bottom surface 52 and the width b of the top surface 53 are both 0.25 μm, and the width e of the inclined surface 54 is 0.1 μm while the track pitch p is 0.7 μm. The playback laser light has a wavelength of 680 nm, while the numerical aperture NA of an objective lens is 0.6 so that the spot diameter is 1.38 μm. The Gaussian distribution of the light intensity of the playback light spot is shown superimposed on the plan view of the optical disc.

If pits are recorded with a narrow track pitch of 0.7 μm in accordance with the in-groove recording system, a portion of a pit M formed on a bottom surface 52 neighboring to an other bottom surface 52 being reproduced is intruded into a playback light spot SP thus producing interference. In addition, since the spatial frequency in the direction perpendicular to the track approaches to a limit of resolution, the tracking error signal amplitude is significantly lowered thus rendering it difficult to perform stable tracking servo, thus resulting in cross-talk.

With the on-land recording system, cross-talk is increased if the track pitch 2 is narrowed to a value of the order of 0.7 μm, for basically the same reason.

Recently, a land-and-groove recording system of recording on both the top surface and on the bottom surface of the groove has been proposed as a recording system of suppressing interference from neighboring tracks.

FIGS. 3A and 3B schematically show an optical disc on which pits have been formed in accordance with the land-and-groove recording system.

FIG. 3A is a cross-sectional view of a transparent substrate, and FIG. 3B is a top plan view of the disc with the playback light being shown converged on the top surface 53. The width a of the bottom surface 52 and the width b of the top surface 53 are both 0.6 μm, and the width e of the inclined surface 54 is 0.1 μm while the track pitch p is 0.7 μm. Since both the bottom surface 52 and the top surface 53 are used as recording tracks, the inclined surface 54 disposed therebetween acts as a heat insulating region. As in FIG. 2B, the Gaussian distribution of the light intensity of the playback light spot is shown superimposed on the plan view of the optical disc.

With the land-and-groove recording system, a height difference d between the bottom surface 52 and the top surface 53 and a playback light wavelength λ within the substrate are controlled for satisfying the relation d=λ/6, with the reflectivity of the recording pit M being e.g., 0%.

With the land-and-groove recording system, since the neighboring recording tracks are the bottom surface 52 and the top surface 53 having a different height level, a tacking error signal is produced with a larger amplitude, such that stable tracking servo may be achieved. On the other hand, since it is the reflectivity of the recording pit M and the height difference d between the bottom surface 52 and the top surface 53 that are controlled, reproduction of the top surface 53 is less liable to be affected by interference from the pit M recorded on the neighboring bottom surface 52. The result is that intrusion of the neighboring pit M into the playback light spot SP to the extent as shown in FIG. 3B raises no particular problem, such that the tracking density approximately twice that with the conventional recording system may be achieved.

However, with the land-and groove recording system, the problem of cross-talk is similarly raised if the track pitch is reduced to a level as low as 0.55 μm.

In FIGS. 4A and 4B, the width a of the bottom surface 52 and the width b of the top surface 53 are both 0.45 μm, and the width e of the inclined surface 54, that is the width of the heat insulating region, is 0.1 μm and the track pitch 2 is 0.55 μm. If the track pitch p is 0.55 μm, the pit M recorded on the neighboring bottom surface 52 is intruded into a region of high light intensity within the light spot Sp of the playback light condensed on the top surface 53. If the neighboring pit M is intruded to a larger extent into the playback light spot SP, the light spot is similarly affected by the pit M even with the land-and groove system, thus resulting in increased cross-talk. On the other hand, since the depth of the bottom surface 52 is minutely controlled and hence the margin of tolerance in power control for groove cutting, detracking or skew or bit width margin is small, the possible errors in these factors, if any, tend to increase the cross-talk significantly.

OBJECT AND SUMMARY OF THE INVENTION

It is therefore an object of the present invention to provide an optical disc in which the track pitch is diminished while the cross-talk is suppressed to a smaller value.

According to the present invention, there is provided an optical disc having a plurality of top surfaces, a plurality of bottom surfaces, and a plurality of portions formed on a major surface of a substrate for separating the top and bottom surfaces from each other. A recording track is constituted by a top surface and a bottom surface each having a first width. Each portion has a second width. The recording track has a track pitch P defined by the sum of the first width and the second pitch, with P<φ/2 and 0.1 μm<second width<φ/2.5, where φ denotes the spot diameter of the playback light.

Preferably, the second width is such that 0.15 μm<second width ±φ/2.5.

Preferably, a layer of a material exhibiting a magneto-optical effect or a layer of a phase change material is recorded as a recording layer on said substrate.

Preferably, a sub-groove having a depth not exceeding the depth of the groove is formed in the above portion.

Preferably, a raised portion having a height exceeding the height of the top surface is formed in said portion.

Preferably, the level difference between the raised portion and the bottom surface is n*φ/2, where n is a natural number and φ is the playback light wavelength within the substrate.

Also preferably, the level difference between the raised portion and the top surface is n*φ/2, where n is a natural number and φ is the playback light wavelength within the substrate.

In other words, the present invention provides an optical disc having an optical disc substrate having a top surface and a bottom surface making up a recording track. The track pitch P of the recording track plus the distance between the recording tracks, that is the width C of the heat insulating region, is set so that the conditions P<φ/2 and 0.1 μm<C<φ/2.5 are met, where φ is the spot diameter of the spot diameter of the playback light. The optical disc employing such optical disc substrate is less susceptible to interference by pits formed in the neighboring recording track even if the track pitch is reduced to a small value of e.g., 0.55 μm, so that signal reproduction with only little cross-talk may be achieved.

If the widths of the top and bottom surfaces making up the recording track are reduced in this manner to a small value, such as 0.55 μm, the pits are prohibited from being enlarged in area and well-defined pits may be formed. These well-defined pits are not only satisfactory as signals, but also enable reliable signal erasure while assuring a high erasure ratio.

In sum, with the optical disc substrate of the present invention, the track pitch P and the distance C between the recording tracks are controlled, so that, with the optical disc employing the optical disc substrate, the cross-talk can be suppressed to a small value even if the track pitch is reduced to a small value on the order of 0.55 μm, thus assuring satisfactory signal reproduction and enabling the recording density to be significantly raised in the direction perpendicular to the track direction.

BRIEF DESCRIPTION OF THE DRAWINGS

FIG. 2A shows the optical disc substrate in a cross-sectional view and FIG. 2B shows the optical disc in a top plan view.

FIG. 3A shows the optical disc substrate in a cross-sectional view and FIG. 3B shows the optical disc in a top plan view.

FIG. 4A shows the optical disc substrate in a cross-sectional view and FIG. 4B shows the optical disc in a top plan view.

FIG. 5 is a cross-sectional view showing an optical disc substrate embodying the present invention.

FIGS. 6A and 6B show the manner in which the playback light is condensed on a bottom surface of the optical disc substrate of FIG. 5, where FIG. 6A shows the optical disc substrate in a cross-sectional view and FIG. 6B shows the optical disc in a top plan view.

FIG. 7A shows the optical disc substrate in a cross-sectional view and FIG. 7B shows the optical disc in a top plan view.

FIG. 8A shows the optical disc substrate in a cross-sectional view and FIG. 8B shows the optical disc in a top plan view.

EMBODIMENTS

Figure 1:
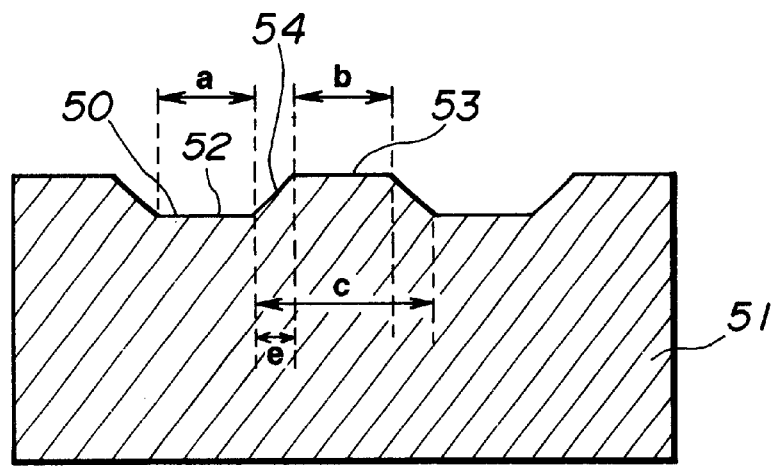
FIG. 1 is a cross-sectional view showing a conventional optical disc substrate.
Figure 2A:
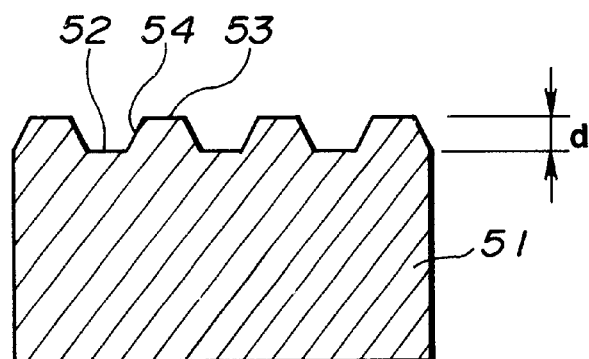
FIGS. 2A and 2B show the manner in which the playback light is condensed on a bottom surface of an optical disc substrate on which recording has been made in accordance with the in-groove recording system, where
Figure 2B:
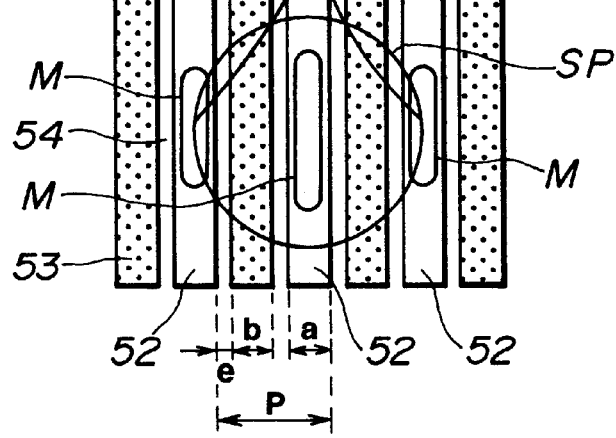

Referring to the drawings, preferred embodiments of the present invention will be explained in detail.

An optical disc substrate of a preferred first embodiment gives an optical disc in which a layer of a material exhibiting phase change characteristics and magneto-optical characteristics is formed as a recording layer to permit recording and reproduction to be performed by a user. The present optical disc substrate is in the form of an optically transparent disc and has a number of bottom surfaces 2 and a number of top surfaces 3 serving as recording tracks for recording information signals on the major surface of the disc, as shown in FIG. 5.

These substantially concentric bottom surfaces 2 different in diameter are formed in the disc surface as guide grooves, while the top surfaces are formed as flat surfaces corresponding to hillocks defined between the bottom surfaces. The lateral surfaces as the boundary between the bottom surfaces 2 and the top surfaces 3 operate as heat-insulating regions for prohibiting a pit from being enlarged in area. That is, the transparent substrate 1 has the bottom surfaces 2 corresponding to flat surfaces of the grooves, the top surfaces 3 corresponding to flat lands having a height difference d therefrom, and the heat insulating regions 4 between the bottom surfaces 2 and the top surfaces 3. It is on the top surfaces 2 and on the bottom surfaces 3 that the information signals are recorded.

With the optical disc substrate of the instant embodiment, a track pitch P, that is the sum of the width of the bottom surface 2 and that of the heat insulating region 4, or (A+C), or the sum of the width of the top surface 3 and that of the heat insulating region 4, or (B+C), is set for satisfying the relation of P<$\phi$/2, where $\phi$ is the spot diameter of the playback light and is equivalent to 1.22×(laser light wavelength $\lambda_0$/numerical aperture NA of the objective lens. In addition, for suppressing the cross-talk to a smaller value even if the track pitch is reduced to a smaller value, the width C of the heat insulating region 4 is set to a larger value for satisfying the relation of 0.1 $\mu$m<$\phi$/2.5.

FIGS. 6A and 6B show the manner in which the playback light is irradiated on an optical disc having the bottom surface 2, top surface 3 and the heat insulating region 4 satisfying the above relation. Specifically, FIG. 6A shows the optical disc substrate in a cross-sectional view, while FIG. 4B shows the optical disc in a top plan view for illustrating the state in which the light is condensed on the top surface 3 of the disc. The width A of the bottom surface 2 and the width B of the top surface 3 are both 0.25 $\mu$m, while the width C of the heat insulating region 4 is 0.3$\mu$m and the track pitch P was 0.55 $\mu$m. The playback laser light has a wavelength of 680 nm, while the numerical aperture NA of the objective lens is 0.6, so that the spot diameter is 1.38 $\mu$m. The Gaussian distribution of the light intensity of the playback light spot is shown superimposed on the plan view of the optical disc.

With the present optical disc, since the recording track is formed by the bottom surface 2 and the top surface 3, neighboring thereto, the tracking error signal is produced with a larger amplitude for achieving stable tracking servo.

Also, with the present optical disc, the width C of the insulating region 4 is of a larger value so that the respective widths A and B of the bottom surface 2 and the top surface 3 making up the recording track are correspondingly diminished. With such optical disc, since the heat insulating region 4 neighboring to the top surface 3 has the broader width C, it is only a narrow region of a peripheral portion of small light intensity of the playback light spot SP that is superimposed on the neighboring bottom surface 2 even although the playback light spot SP condensed on the top surface 3 is superimposed on the neighboring bottom surface 2. The result is that the interference by the pit M on the neighboring groove 2 is less liable to be produced so that the cross-talk can be suppressed if the track pitch is reduced to a small value of the order of 0.55 $\mu$m.

In addition, if the bottom surface 2 and the top surface 3 making up a recording track are of narrow width, the pit M may be prohibited from being enlarged in area, when the pit M is produced, so that the pit M of a well-defined shape may be produced. The well-defined pit M is not only satisfactory as a signal but also may be re-erased positively thus leading to a high erasure ratio.

The broader the width C of the heat insulating region 4, the more effectively the cross-talk may be suppressed. However, if this width C becomes excessively broader, the respective widths A and B of the top surface 3 and the bottom surface 4 making up the recording track become excessively narrow such that a sufficient S/N (C/N) ratio cannot be achieved. On the other hand, the narrow width of the top surface 3 or the bottom surface 2 on the order of 0.1 $\mu$m is difficult to achieve with the current status of the cutting technique of the mastering process. Thus the upper limit of the width C of the heat insulating region 4 is $\phi$/2.5.

Figure 7A:
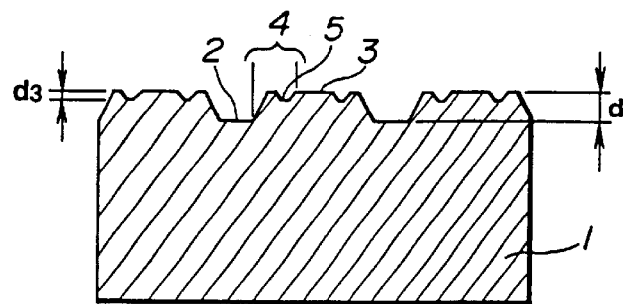
FIGS. 7A and 7B show a modification of an optical disc substrate according to the present invention, where
Figure 7B:
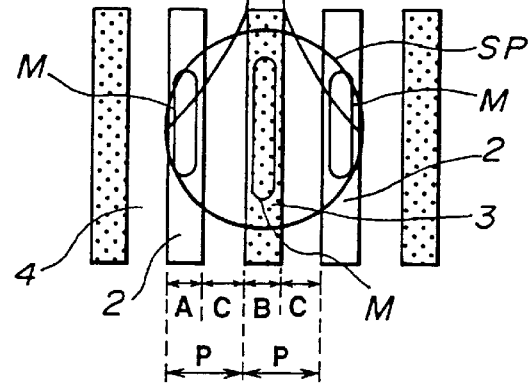
Figure 8A:
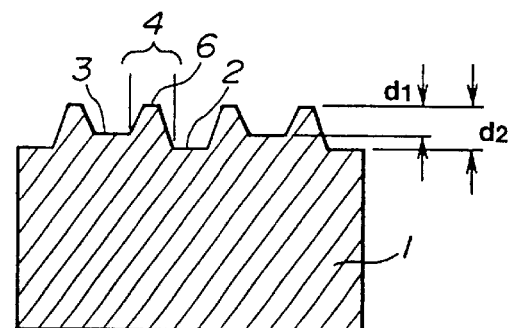
FIGS. 8A and 8B show a further modification of an optical disc substrate according to the present invention, where

Although the heat insulating region 4 between the bottom surface 2 and the top surface 3 of the above-described magneto-optical disc is formed by an inclined surface, the shape of the heat insulating region 4 is not limited thereto. For example, it is possible to form the hillock with a broader width and to form fine-sized sub-grooves 5 defining the width of the heat insulating region 4 in the vicinity of marginal portions of the hillock, as shown in FIGS. 7A and 7B. The sub-groove 5 has a depth $d_3$ which satisfies relation of 0<$d_3$<d. In this case, the planar surface defined between the sub-grooves 5, 5 represents the land (top surface) 3, and the planar surface reaching from the sub-groove 5 as far as the lower end of the inclined surface 4 represents a heat-insulating region 4 and the planar bottom surface of the groove represents the bottom surface 2. There is no particular limitation to the shape of the sub-groove 4 formed in the hillock such that it may be U-shaped or V-shaped in cross-section, in addition to being trapezoidal in cross-section, as shown in FIG. 7A. It is also possible to form a raised portion 6 higher in height level than the top surface between the bottom surface 2 and the top surface 3, as shown in FIG. 8A. In this case, a region inclusive of the planar surface of the raised portion 6 and inclined surfaces on either sides thereof operates as the heat insulating region 4. If this raised portion 6 is to be formed, a difference in height level $d_1$ between the raised portion 6 and the top surface 3 or a difference in height level $d_2$ between the raised portion 6 and the bottom surface 2 is preferably represented by n*$\lambda$2, where n is an integer not less than 1. This is effective to suppress cross-talk further.

The above-described optical disc substrate may be produced by a usual method for producing a substrate. That is, the optical disc substrata may be molded to a pre-set shape by injection molding a transparent high molecular material, such as polyolefine resin, or by forming the grooves on a glass substrate by a glass 2P (photopolymerization) method.

Although a light exposing (cutting) method employing a resist is frequently employed as a mastering method, it is also possible to employ an etching method. The sub-grooves 5 formed in the optical disc substrate shown in FIG. 7A or the raised portion 6 formed on the optical disc substrate shown in FIG. 8 may be formed by half-cutting in combination with 2-beam cutting.

A recording layer is then formed on the optical disc substrate thus formed with a pre-set irregular surface to provide an optical disc.

The material that makes up the recording layer may be enumerated by a phase change material or a material exhibiting magneto-optical characteristics.

Among materials for the phase change layer, there are chalcogen alone or chalcogenites, that is chalcogen compounds. For example, Te or Se alone or chalcogenite-based materials, such as Ge—Sb—Te, Ge—Te, In—Sb—Te—Ag), In—Se—(—Tl—Co), In—Sb—Se, $BiTe_3$, BiSe, $Sb_2Se_3$, $Ab_2Te_3$, may be employed.

Examples of preferred sorts of films exhibiting magneto-optical properties are films of rare earth transition metal amorphous alloys, such as TeFeCo.

Figure 9:
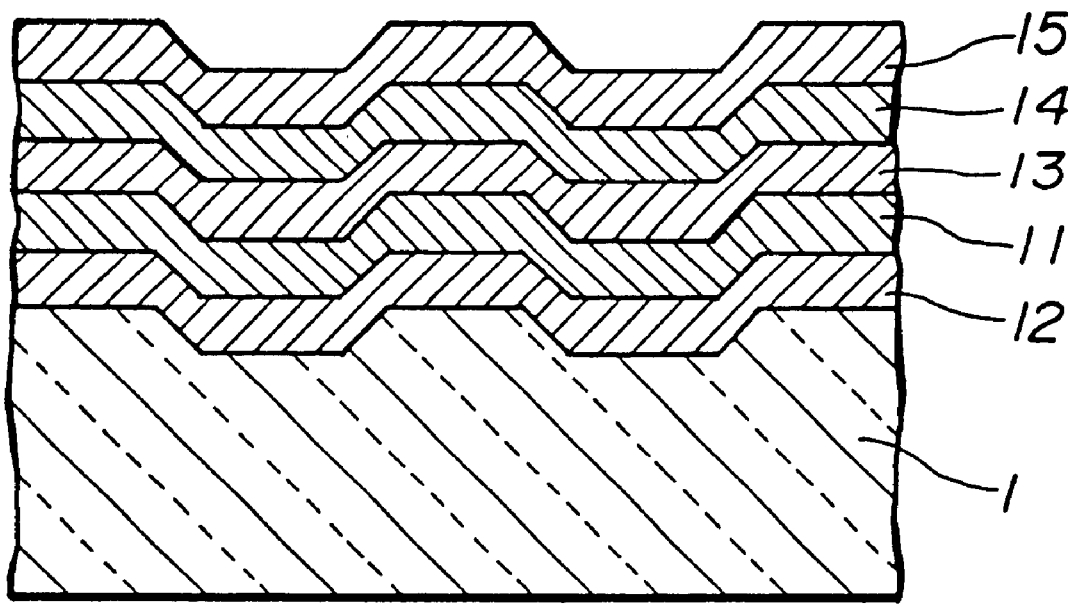
FIG. 9 is a cross-sectional view of an optical disc having an optical disc substrate according to the present invention.

As an optical disc, it is possible to provide a first dielectric layer 12 and a second dielectric layer 13 on both sides of a recording layer 11 and to provide a reflective layer 14 and a protective layer 15 on the second dielectric layer 13, as shown in FIG. 9.

With the five-layer optical disc, the first dielectric layer 12, the second dielectric layer 13 and the reflective layer 14 control optical properties of the disc, such as reflectivity, while the second dielectric layer 13 and the reflective layer 14 control thermal characteristics thereof and the protective layer 15 improves durability thereof.

The conditions for materials for the five-layer optical disc include non-absorption in the semiconductor laser wavelength range. Thus the materials may be enumerated by nitrides, oxides and sulfides of metals, such as Al or Si and metalloids, e.g., AlN, $Si_3N_4$, $SiO_2$, $Al_2O_3$, ZnS or $MgF_2$.

The materials for the reflective layer 14 may be enumerated by metal elements, metalloid elements, semiconductor elements, compounds or mixtures thereof having thermal conductivity of 0.0004 J/(cm.K.s) to 2.2 J/(cm.K.s).

The protective layer 15 may be formed of UV curable resins and materials employed for the above dielectric layer.

For the protective layer 15, the materials which may be employed for the above dielectric layer may be employed, in addition to the UV curable resin.

In addition, a semi-transparent metal layer may be provided between the first dielectric layer 12 and the recording layer 11 for further improving optical characteristics. The semi-transparent metal layer means such a layer of a material in which, in a complex refractive index (n-ik) for a semiconductor laser wavelength, the refractive index n is not more than 1 and the extinction coefficient is not less than 2.5 and not more than 5, and which may be enumerated by e.g., Au, Cu, Ag or Pt.

Next, optical disc substrates were actually fabricated and the effects in controlling the width of the heat insulating area were checked.

EXAMPLE 1

An optical disc substrate was fabricated by injection molding of a polycarbonate material.

The optical disc substrate fabricated was of the type shown in FIGS. 6A and 6B in which the boundary between the bottom surface 2 and the top surface 3 is formed by an inclined surface which operates as the heat insulating region 4. The width A of the bottom surface 2 and the width B of the top surface 3 were both 0.25 $\mu$m, while the width C of the heat insulating region 4 was 0.3 $\mu$m and the track pitch P was 0.55 $\mu$m, with the height level difference d between the bottom surface 2 and the top surface 3 being 78 nm.

On the surface of the thus fabricated optical disc substrate, presenting pre-set irregular features as described above, a first ZnS—$SiO_2$ dielectric layer of a ZnS—$SiO_2$ mixture, having a film thickness of 110 nm, a layer of a phase change material of $Ge_2Sb_2Te_5$, having a film thickness of 25 nm, a second ZnS—$SiO_2$ dielectric layer having a film thickness of 18 nm, and an Al reflective layer having a film thickness of 100 nm, were formed by sputtering.

A UV curable resin was spin-coated on the Al reflective layer for forming a protective layer with a film thickness of 6 $\mu$m for completing an optical disc.

EXAMPLE 2

The optical disc substrate fabricated in Example 2 was of the type shown in FIGS. 7A and 7B in which hillock was of a larger width and sub-grooves 5 of a U-shaped cross-section are formed in the vicinity of the marginal edges of the hillock. The region extending from the sub-groove 5 to the inclined surface serves as the heat insulating region 4. The width A of the bottom surface 2 and the width B of the top surface 3 were both 0.25 $\mu$m, while the width C of the heat insulating region 4 is 0.3 $\mu$m and the track pitch P was 0.55 $\mu$m, with the height level difference d between the bottom surface 2 and the top surface 3 being 78 nm and with the depth $d_3$ of the sub-groove 5 being 20 nm.

On the surface of the thus fabricated optical disc presenting pre-set irregular features, a first ZnS—$SiO_2$ dielectric layer, a layer of a $Ge_2Sb_2Te_5$ phase-change material, a second ZnS—$SiO_2$ dielectric layer, an Al reflective layer and a protective layer were formed for completing an optical disc.

EXAMPLE 3

The optical disc substrate fabricated in Example 3 was of the type shown in FIGS. 7A and 7B in which the hillock was of a larger width and sub-grooves 5 of U-shaped cross-section were formed in the vicinity of the marginal edges of the hillock. The region extending from the sub-groove 5 to the inclined surface serves as the heat insulating region. The width A of the bottom surface 2 and the width B of the top surface 3 were both 0.25 $\mu$m, while the width C of the heat insulating region 4 was 0.3 $\mu$m and the track pitch P was 0.55 $\mu$m, with the height level difference d between the bottom surface 2 and the top surface 3 being 78 nm and with the depth $d_3$ of the sub-groove 5 being 20 nm.

On the surface of the thus fabricated optical disc presenting pre-set irregular features, a first ZnS—$SiO_2$ dielectric layer, a layer of a $Ge_2Sb_2Te_5$ phase-change material, a second ZnS—$SiO_2$ dielectric layer, an Al reflective layer and a protective layer were formed for completing an optical disc.

EXAMPLE 4

Figure 8B:
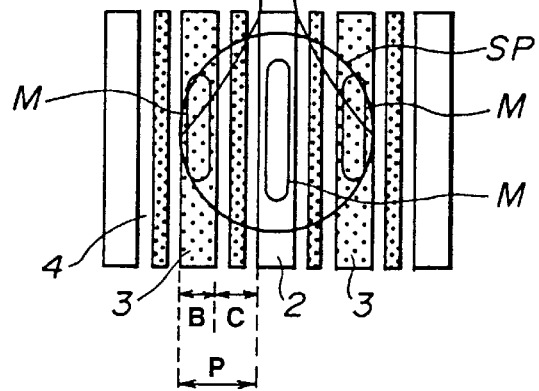

An optical disc substrate fabricated in the present Example was of the type shown in FIGS. 8A and 8B, with a raised portion 6 being formed between the upper surface 3 and the bottom surface 2, with the planar surface of the raised portion 6 and both incline surfaces representing the heat insulating region 4. The width A of the bottom surface 2 and the width B of the top surface 3 were both 0.25 μm, while the width C of the heat insulating region 4 is 0.3 μm (the width of the raised portion 6 and that of the inclined surface were 0.1 μm and 0.1 μm and the width of the inclined surface was 0.1 μm, with the track pitch P being 0.55 μm. The height difference $d_1$ between the raised portion 6 and the upper surface 3 is 233 nm, while the height difference $d_2$ between the raised portion 6 and the bottom surface 3 is 311 nm. This height difference of 233 nm corresponds to $\lambda/2$ and the height difference of 311 nm corresponds to $\lambda/2+\lambda/6$, where $\lambda$ denotes the wavelength of the playback light within the substrate.

On the surface of the thus fabricated optical disc presenting pre-set irregular features, a first ZnS—SiO$_2$ dielectric layer, a layer of a Ge$_2$Sb$_2$Te$_5$ phase-change material, a second ZnS—SiO$_2$ dielectric layer, an Al reflective layer and a protective layer were formed for completing an optical disc.

COMPARATIVE EXAMPLE 1

Figure 3A:
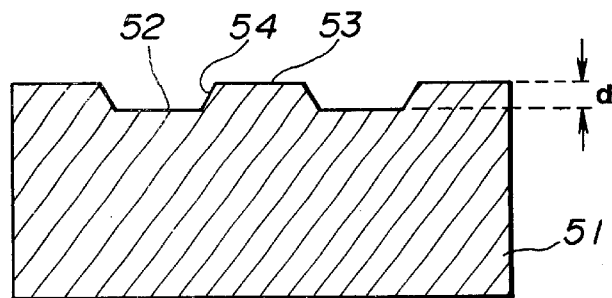
FIGS. 3A and 3B show the manner in which the playback light is condensed on a top surface of an optical disc substrate on which recording has been made in accordance with the land-and-groove recording system, where
Figure 3B:
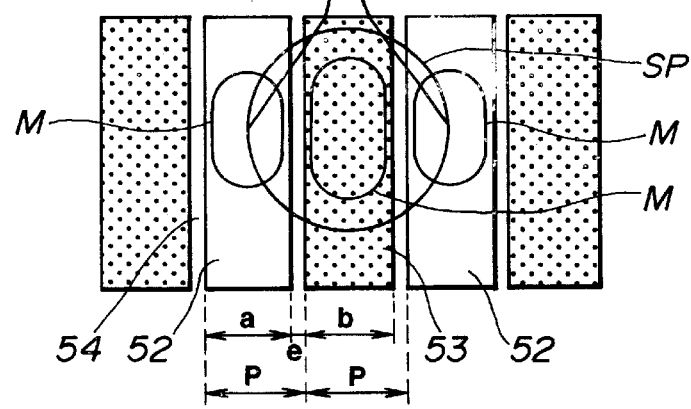

The optical disc substrate fabricated was of the type shown in FIGS. 3A and 3B in which the boundary between the bottom surface 52 and the top surface 53 is formed by an inclined surface which operates as the heat insulating region 54. The width a of the bottom surface 52 and the width b of the top surface 53 were both 0.6 μm, while the width c of the heat insulating region 4 is 0.1 μm and the track pitch p was 0.7 μm, with the height level difference d between the bottom surface 52 and the top surface 53 being 78 nm.

On the surface of the thus fabricated optical disc presenting pre-set irregular features, a first ZnS—SiO$_2$ dielectric layer, a layer of a Ge$_2$Sb$_2$Te$_5$ phase-change material, a second ZnS—SiO$_2$ dielectric layer, an Al reflective layer and a protective layer were formed as in Example 1 for completing an optical disc.

COMPARATIVE EXAMPLE 2

Figure 4A:
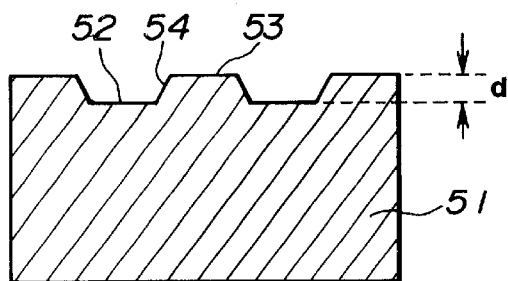
FIGS. 4A and 4B show an optical disc substrate on which recording has been made in accordance with the land-and-groove recording system, with the track pitch has been reduced, where
Figure 4B:
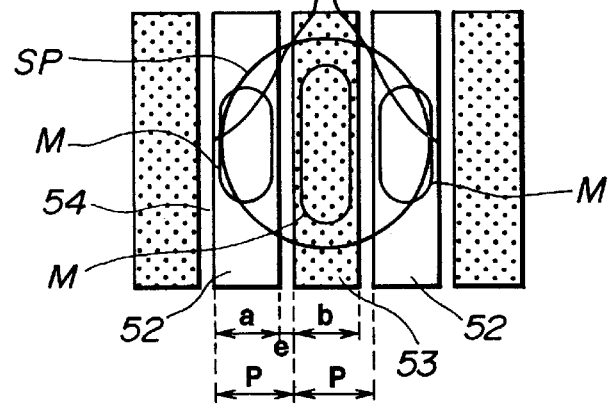

The optical disc substrate fabricated was of the type shown in FIGS. 4A and 4B in which the boundary between the bottom surface 52 and the top surface 53 is formed by an inclined surface which operates as the heat insulating region 54. The width a of the bottom surface 52 and the width b of the top surface 53 were both 0.45 μm, while the width c of the heat insulating region 4 was 0.1 μm and the track pitch p was 0.55 μm, with the height level difference d between the bottom surface 52 and the top surface 53 being 78 nm.

On the surface of the thus fabricated optical disc presenting pre-set irregular features, a first ZnS—SiO$_2$ dielectric layer, a layer of a Ge$_2$Sb$_2$Te$_5$ phase-change material, a second ZnS—SiO$_2$ dielectric layer, an Al reflective layer and a protective layer were formed for completing an optical disc.

On the top surface and the bottom surface of the fabricated optical disc were recorded pits with a mark length of 0.9 μm, with a linear velocity of 5 m/sec and a frequency of 2.8 MHz, and the cross-talk of the playback signals was measured.

With the laser wavelength $\lambda_0$ of 680 nm and the numerical aperture NA of the objective lens of 0.6, the spot diameter of the playback light was 1.38 μm.

The recording/reproduction was carried out with a recording power of 13 mW, a bias power of 5 mW and a playback power of 1 mW.

The cross-talk was evaluated in terms of a ratio of a signal amplitude when tracing the top or bottom surface to the signal amplitude when tracing the neighboring top or bottom surface. The results are shown in Table 1.

TABLE 1

|  | cross-talk |
| --- | --- |
| Example 1 | < −30 dB |
| Example 2 | < −30 dB |
| Example 3 | < −30 dB |
| Example 4 | < −30 dB |
| Comparative Example 1 | < −30 dB |
| Comparative Example 2 | < −26 dB |

It is seen from Table 1 that, with the optical disc of the Examples 1 to 4 in which the width of the heat insulating region is set to a wider value of 0.3 μm, the cross-talk can be set to a lower value of <−30 dB, even with the smaller value of the track pitch of 0.55 μm.

Conversely, with the smaller value of the heat insulating region of 0.1 μm, the cross-talk can be suppressed to a lower value of <−30 dB if the track pitch is 0.7 μm. However, if the track pitch is reduced to a still lower value of 0.55 μm (Comparative Example 2), the cross-talk exceeds −26 dB.

Thus it is apparent that the setting of the width of the heat insulating region to a wider range of values for satisfying the relation of 0.1 μm<C≦φ/2.5 is effective in reducing the track pitch as well as in suppressing the cross-talk.

By way of comparison, an optical disc was fabricated in a similar manner using an optical disc substrate of the type shown in FIGS. 7A and 7B with the width of the heat insulating region of not more than 0.15 μm, and cross-talk was measured. It was seen that, if the track pitch is set to 0.55 μm, the cross-talk reached a larger value than those of the optical discs of the Examples 1 to 4.

What is claimed is:

1. An optical disc having a plurality of top surfaces, a plurality of bottom surfaces and a plurality of separating portions formed on a major surface of a substrate, said portions separating said top and bottom surfaces from each other, said bottom surfaces being positionally displaced from said top surfaces by a depth to define a groove having said depth, wherein the improvement resides in that a recording track is constituted by each top surface and each bottom surface;

each bottom surface and each top surface having a first width;

each separating portion has a second width;

said recording track having a track pitch P defined by the sum of said first width and said second width, with P<φ/2 and 0.1 μm<second width <φ/2.5, where φ denotes the spot diameter of the playback light.

2. The optical disc as claimed in claim 1 wherein the second width is such that 0.15 μm<second width ±φ2.5.

3. The optical disc as claimed in claim 1 wherein a layer of a material exhibiting a magneto-optical effect or a layer of a phase change material is recorded as a recording layer on said substrate.

4. The optical disc as claimed in claim 1 wherein sub-grooves having a depth not exceeding the depth of the bottom surface are formed in said portions.

5. The optical disc as claimed in claim 3 wherein a layer of a material exhibiting a magneto-optical effect or a layer of a phase change material is recorded as a recording layer on said substrate.

6. The optical disc as claimed in claim 1 wherein a raised portion having a height exceeding the height of the top surfaces is formed in each of said separating portions.

7. The optical disc as claimed in claim 5 wherein a layer of a material exhibiting a magneto-optical effect or a layer of a phase change material is provided as a recording layer on said substrate.

8. The optical disc as claimed in claim 5 wherein a level difference between the raised portion and the bottom surface is $n*\phi/2$, where n is a natural number and $\phi$ is the playback light wavelength within the substrate.

9. The optical disc as claimed in claim 5 wherein a level difference between the raised portion and the top surface is $n*\phi/2$, where n is a natural number and $\phi$ is the playback light wavelength within the substrate.

* * * * *